Dec. 3, 1940.   E. E. DIVELBISS   2,223,677
TOW BAR
Filed Feb. 12, 1940
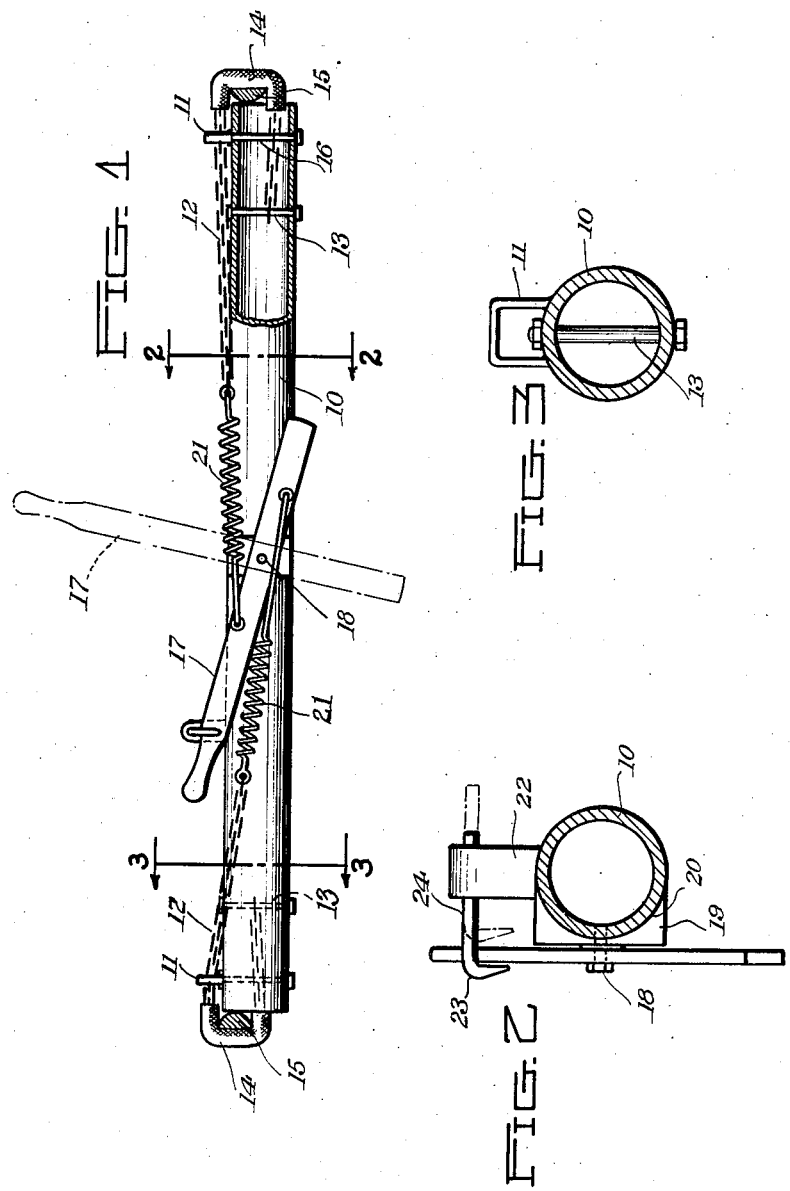
INVENTOR.
ELMER E. DIVELBISS
BY Victor J. Evans & Co.
ATTORNEYS.

Patented Dec. 3, 1940

2,223,677

UNITED STATES PATENT OFFICE 2,223,677

TOW BAR

Elmer E. Divelbiss, Compton, Calif.

Application February 12, 1940, Serial No. 318,612

2 Claims. (Cl. 280—33.14)

This invention relates to tow bars and has for an object to provide a tow bar which may be effectively used for towing automobiles or farm implements and may be hooked to either the bumper or the axle of the vehicle without the use of tools, and which when applied will automatically take up any slack that might occur in the chains of the device while the tow bar is in use.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a tow bar constructed in accordance with the invention with parts broken away.

Figure 2 is an enlarged cross sectional view taken on the line 2—2 of Figure 1 looking in the direction of the arrows.

Figure 3 is an enlarged cross sectional view taken on the line 3—3 of Figure 1 looking in the direction of the arrows.

Referring now to the drawing in which like characters of reference designate similar parts in the various views, the tow bar comprises a metal tube 10 provided on the outer side thereof near the ends with metal guide loops 11 through which respective chains 12 are passed. The outer ends of the chains are passed into the bore of the tube and secured to respective bolts 13 in the bore, best shown in Figure 3. The chains are provided near the ends externally of the tube with a rubber or other suitable protective covering 14 adapted to embrace the vehicle bumper 15. A second pair of bolts 16 are disposed in the bore of the tube in close proximity to the ends of the tube to interchangeably receive the ends of the chains to adapt the device to be secured to the axle of a vehicle.

A lever 17 is pivoted between its ends on a pivot bolt 18, best shown in Figure 2, which is engaged through a spacing block 19 having a rounded face 20 abutting the side of the tube at the center of the tube 10, the bolt being threaded into the tube or otherwise secured to the tube.

A pair of helical springs 21 are connected at the outer ends to respective inner ends of the chains 12 and are connected at the inner ends to the lever 17 on opposite sides of the pivot bolt 18, as best shown in Figure 1. These springs are placed under tension when the lever is rocked to a position longitudinally of the tube 10 and take up the slack in the chains 12 after the latter have been passed around the bumpers 15. The springs constantly tend to hold the ends of the tube against the bumpers, as shown in Figure 1, and expand under certain conditions of service during the towing of a vehicle to permit flexibility of the device and prevent breakage. During towing of the vehicle the springs take up any slack in the chains 12.

For holding the lever in operative position a bracket 22 is formed integral with the spacing block 19 and extends from the spacing block perpendicular to the tube 10. A locking hook 23 is engaged over the lever 17 to hold the lever in operative position. The hook has a straight shank 24 which is slidably mounted in an opening in the bracket 22 so that the hook may be slid inwardly, as shown by dotted lines in Figure 2, atfer it is turned on its axis to release the lever 17, to permit the lever to be rocked to the dotted line position shown in Figure 1, for slacking off the tow bar. When the lever is rocked to the towing position shown in Figure 1, the hook is slid forwardly in the bracket 22 and rocked axially to hook over the lever and hold the lever in operative position.

In operation, when attaching the tow bar to the bumpers 15 of motor vehicles, the chains 12 are unhooked from the springs 21 and passed around the bumpers, then hooked to the springs again. The lever 17 is then swung to extend longitudinally of the tube 10 and secured in this position by the hook 23. The bumpers 15 are thus secured in yielding engagement with the end edges of the tube 10 during the towing operation, there being sufficient pivotal engagement between the tube 10 and the bumpers 15 to adapt the vehicle to curves and to uneven road conditions.

From the above description it is thought that the construction and operation of the invention will be fully understood without further explanation.

What is claimed is:

1. A tow bar comprising a tube, guide loops on the tube near the ends thereof, chains trained through the guide loops and having their outer ends disposed within the ends of the tube, bolts connecting said end of the chains to the tube, a lever pivotally mounted intermediate its ends on the tube at the center of the tube and adapted to swing transversely of and longitudinally of the tube, helical springs having their outer ends connected to the inner ends of respective chains and having their inner ends connected to the lever on opposite sides of the pivot of the lever for taking up slack in the chains when the lever is disposed longitudinally of the bar, and means releasably holding the lever to extend longitudinally of the bar.

2. A tow bar comprising a tube, guide loops on the exterior of the tube near the ends thereof, chains trained through the guide loops and having their outer ends disposed in the ends of the tube, means securing said ends of the chains to the tube, a spacing block having a rounded face abutting the side of the tube at the center of the tube, a pivot bolt carried by the block and secured to the tube, a lever pivoted intermediate its ends on the pivot bolt, a pair of helical springs connected at the outer ends to respective inner ends of the chains and connected at the inner ends to the lever on opposite sides of the pivot bolt, a bracket carried by the block, and a hook slideably mounted in the bracket to releasably engage the lever and hold the lever in position longitudinally of the tube to tension the helical springs and take up slack in the chains.

ELMER E. DIVELBISS.